United States Patent [19]

Grego

[11] Patent Number: 4,523,938
[45] Date of Patent: Jun. 18, 1985

[54] METHOD OF AND APPARATUS FOR CONTINUOUSLY MONITORING DIAMETER VARIATIONS OF AN OPTICAL FIBER BEING DRAWN

[75] Inventor: Giorgio Grego, Turin, Italy

[73] Assignee: Cselt - Centro Studi E Laboratori Telecomunicazioni S.p.A., Turin, Italy

[21] Appl. No.: 394,535

[22] Filed: Jul. 2, 1982

[30] Foreign Application Priority Data

Jul. 6, 1981 [IT] Italy .................. 67936 A/81

[51] Int. Cl.$^3$ ............................................. C03B 37/02
[52] U.S. Cl. ...................................... 65/2; 65/10.1; 65/13; 65/29; 65/158; 65/163
[58] Field of Search ............... 65/2, 3.11, 10.1, 13, 65/29, 158, 163; 324/61 R

[56] References Cited

U.S. PATENT DOCUMENTS

| 3,088,297 | 5/1963 | Kapany et al. ............ 65/13 X |
| 3,221,171 | 11/1965 | Locher ..................... 324/61 R |
| 3,865,564 | 2/1975 | Jaeger et al. .............. 65/13 X |
| 4,060,965 | 12/1977 | Schwartz .................. 324/61 R |
| 4,123,242 | 10/1978 | Imoto et al. ............... 65/2 X |

FOREIGN PATENT DOCUMENTS 680695 10/1952 United Kingdom .
855595 12/1960 United Kingdom .
2020816 11/1979 United Kingdom .

OTHER PUBLICATIONS

Gutmann, "The Electret", Reviews of Modern Physics, vol. 20, No. 3, Jul. 1948, pp. 457-470.

Primary Examiner—William F. Smith
Attorney, Agent, or Firm—Karl F. Ross; Herbert Dubno

[57] ABSTRACT

An optical fiber, being drawn from a preform and wound upon a reel, passes between parallel plates of a capacitor connected in a measuring circuit which, from the capacitance variations due to changes in fiber diameter, controls a reel-driving motor to minimize these variations. The capacitor may have a constant charge, as by having one of its plates made of an electret, in which case the capacitance variations are determined from voltage changes. A calculator connected to the measuring circuit translates these variations into numerical values representing the fiber diameter which can be visually displayed.

4 Claims, 3 Drawing Figures

METHOD OF AND APPARATUS FOR CONTINUOUSLY MONITORING DIAMETER VARIATIONS OF AN OPTICAL FIBER BEING DRAWN

FIELD OF THE INVENTION

My present invention relates to a method of continuously monitoring variations in the diameter of an optical fiber, which is being drawn from a preform, and to an apparatus for carrying out this method.

BACKGROUND OF THE INVENTION

The constancy of the diameter of an optical fiber is important for the minimization of losses in the transmission of signals therethrough. In order to insure such constancy, the fiber should be continuously monitored during its manufacture, i.e. while it is being drawn from a heated preform at a speed which can be adjusted to minimize deviations from a predetermined diameter. Such a monitoring operation requires a precise measurement of the fiber diameter for the purpose of detecting any incipient change.

A conventional method of measuring that diameter utilizes a laser beam which is reciprocated across the path of the fiber in a plane perpendicular thereto and illuminates a photodiode. With that method it is possible to calculate the fiber diameter from the known speed of the angular beam motion and from the interval during which the photodiode is obscured. The equipment required for this purpose is rather expensive and, with present-day facilities, has a resolution on the order of one micron which often is insufficient.

Another method involves the focusing of light from a fixed source upon a photodiode matrix, with the aid of an optical system such as a microscope objective, across the fiber path and measuring the extent of the shadow cast upon that matrix. This technique is suitable for fibers traveling with a precisely controlled motion but is unsatisfactory for monitoring during the fiber-drawing process since unavoidable vibrations of the fiber tend to cause major errors detectable only by a repetition of the measuring operation. Such oscillations of the advancing fiber also make it difficult to measure the diameter by interferential methods since the continuous shifting of the interference fringes impedes their evaluation.

OBJECTS OF THE INVENTION

An important object of my present invention, therefore, is to provide a highly precise method of measuring the diameter of a fiber being drawn which is easy to implement and is unaffected by their vibrations.

A related object is to provide a simple apparatus for carrying out this method.

SUMMARY OF THE INVENTION

I realize these objects, in accordance with my present invention, by passing the fiber to be tested—being drawn from a preform—between parallel plates of a capacitor or condenser and detecting the capacitance variations due to changes in the fiber diameter. These variations can be used to modify the fiber-drawing speed so as to minimize, in a manner known per se, any detected deviation of the fiber diameter from its predetermined value.

An apparatus designed to implement this procedure, in accordance with my present invention, comprises heating means for fusing a preform to be converted into the optical fiber, winding means downstream of the heating means for continuously drawing the fiber from that preform, a capacitor with a pair of parallel plates spacedly flanking the fiber between the heating and winding means, and a measuring circuit connected across the capacitor for detecting the aforementioned capacitance variations.

Advantageously, the apparatus further comprises a calculator connected to the measuring circuit for converting the capacitance variations into numerical values which represent the detected diameter deviations. The values can be visually displayed to an operator even as the winding speed is being adjusted, through a feedback connection from the measuring circuit to a driving motor, for countering the diameter changes.

BRIEF DESCRIPTION OF THE DRAWING

The above and other features of my invention will now be described in detail with reference to the accompanying drawing in which.

SPECIFIC DESCRIPTION

Figure 1:
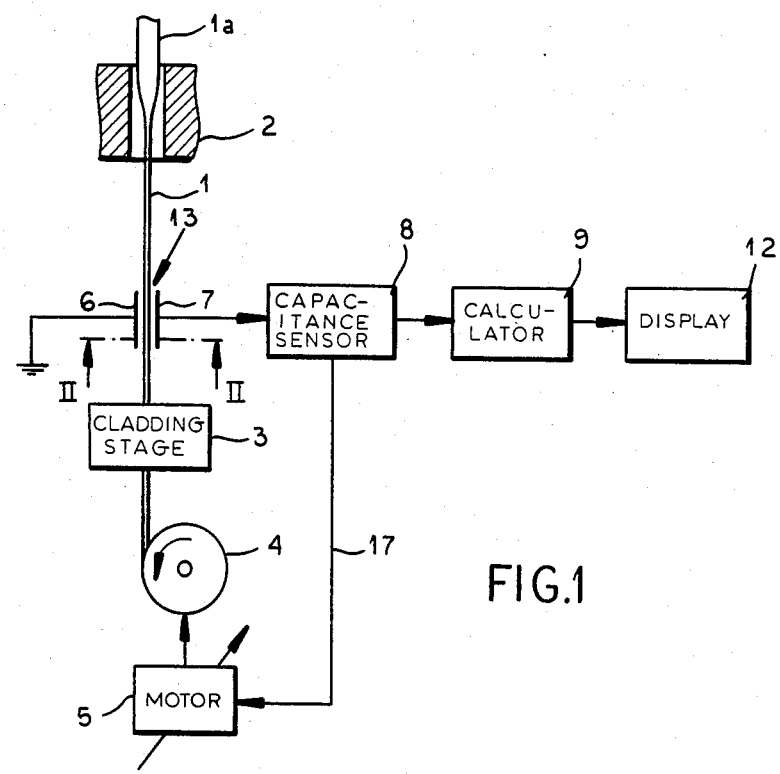
FIG. 1 is a diagrammatic representation of a fiber-drawing plant equipped with a diameter-monitoring apparatus embodying my invention.

As shown in FIG. 1, an optical fiber 1 is being continuously drawn from a preform 1a undergoing fusion in a heating chamber 2. The fiber passes through a cladding stage 3 to a winding reel 4 driven by a motor 5 of adjustable speed.

In accordance with my present invention, a capacitor or condenser 13 with two plates 6 and 7 is disposed between the heating stage 2 and the winding stage 4 so as to bracket the advancing and vibrating fiber 1 with sufficient clearance to keep its plates from contacting same. With plate 6 shown grounded, plate 7 is connected to a measuring circuit in the form of a capacitance sensor 8 working into a calculator 9 which determines the numerical value of the fiber diameter and feeds it to a display 12. A feedback connection 17 extends from sensor 8 to motor 5 for adjusting its speed to counter any detected deviation of the fiber diameter from a predetermined value. Sensor 8 may comprise, for example, a capacitor bridge including the condenser 13 in one of its arms.

The calculation of the fiber diameter $d = 2r$ is performed on the basis of the relationship $$\frac{\Delta C}{C} = \frac{r^2 \pi}{S} \cdot \frac{\epsilon_1 - \epsilon_0}{\epsilon_1 + \epsilon_0}$$

where S is the area in a plane perpendicular to the fiber path encompassed by condenser plates 6 and 7, $\epsilon_o$ is the dielectric constant of the medium (air or some other gas) occupying that area, $\epsilon_1$ is the dielectric constant of the fiber material and C is the capacitance of condenser 13 in the absence of a fiber. The radius r can be determined from the foregoing formula by solving Laplace's equation, with insertion of the proper boundary conditions, and treating the introduction of the fiber as a perturbation.

Figure 2:
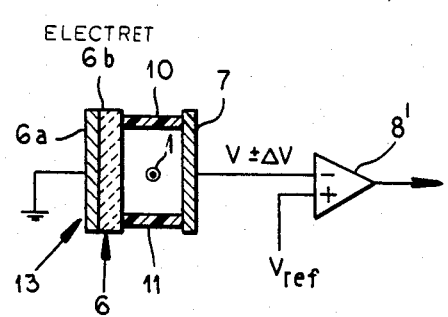
FIG. 2 is a cross-sectional view taken on the line II—II of FIG. 1 and drawn to a larger scale.

Advantageously, and as more particularly illustrated in FIG. 2, condenser 13 is a constant-charge capacitor with one of its plates—here specifically plate 6—formed by an electret. Thus, plate 6 is shown in FIG. 2 to comprise a metallic base 6a supporting an electrized membrane 6b; the plates 6 and 7 are held separated by a pair of dielectric spacers 10 and 11. In this instance the capacitance change is proportional to the voltage change of plate 7, i.e.

$$\frac{\Delta C}{C} = \frac{\Delta V}{V},$$

provided the electrical field in the region surrounding the fiber is constant (S>>r). Thus, for example, radius r may be on the order of 100 microns while each plate, assumed to be rectangular, may have a height and a width of the order of several millimeters. With the vibration stroke of the fiber generally amounting to about one or two diameters, the spacing of plates 6 and 7 should be several such diameters and will depend on the charge of the capacitor, taking into account the dielectric strength of the medium which in the case of air is about 2 KV/mm. Spacers 10 and 11 may consist of Teflon, for example.

As further shown in FIG. 2, capacitance sensor 8 of FIG. 1 is here represented by a differential amplifier 8' whose inverting input is connected to plate 7 for comparing its potential $V \pm \Delta V$ with a reference voltage $V_{ref}$ applied to its noninverting input.

Figure 3:
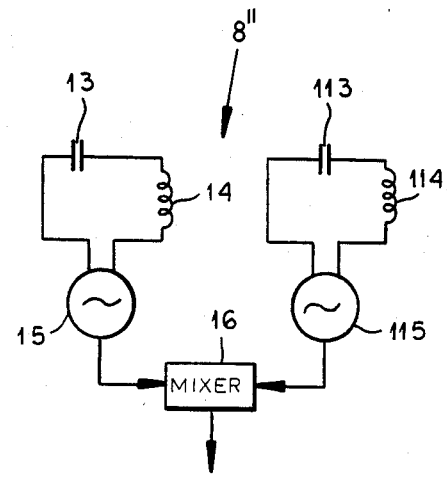
FIG. 3 is a circuit diagram of a capacitance sensor usable in the apparatus of FIG. 1.

FIG. 3 illustrates another possible capacitance sensor 8" comprising an oscillator 15 whose tank circuit includes the capacitor 13 together with an inductor 14. A similar tank circuit, with a capacitor 113 and an inductor 114 of known magnitudes, determines the frequency of another oscillator 115 whose output is connected to a mixer 16 also receiving the output frequency of oscillator 15. With tank circuit 113, 114 properly calibrated, the beat frequency generated by mixer 16 will be zero when the capacitance of condenser 13 has a magnitude corresponding to the desired diameter; otherwise, this beat frequency will be converted into the control signal delivered to motor 5 on feedback connection 17. Reference capacitor 113 may be identical with condenser 13 and may encompass a stationary fiber of the requisite diameter.

The use of rectangular plates avoids any significant change in the measured capacitance by excursions of the fiber in a direction parallel to these plates. In principle, however, the plates could also be triangular, circular or elliptical, for example; in that instance the mean value of the capacitance change resulting from the introduction of the fiber can be used to provide a corrective signal compensating for shifts of the fiber path parallel to the plates. The periodic capacitance changes caused in such a case by the fiber oscillations in a parallel plane are distinguishable from the irregular variations due to deviations in diameter.

I claim:

1. A method of minimizing variations in the diameter of an optical fiber being drawn from a preform, comprising the steps of:
   (a) passing said fiber between two parallel plates of a constant-charge capacitor, one of said plates being an electret;
   (b) continuously comparing the potential of the other of said plates with a reference voltage; and
   (c) modifying the fiber-drawing speed in response to differences between said potential and said reference voltage in a sense tending to reduce said differences.

2. In an apparatus for drawing an optical fiber from a preform, including heating means for fusing a preform to be converted into an optical fiber, winding means downstream of said heating means for continuously drawing said fiber from said preform, and variable-speed drive means coupled with said winding means, the combination therewith of:
   a constant-charge capacitor with a pair of parallel plates spacedly flanking said fiber between said heating means and said winding means, one of said plates being an electret;
   a source of reference voltage; and
   comparison means with inputs respectively connected to the other of said plates and said source for detecting differences between said reference voltage and the potential of said other of said plates, said comparison means having an output circuit connected to said drive means for modifying the speed of said winding means in a sense tending to reduce said differences.

3. An apparatus as defined in claim 2, further comprising calculating means connected to said comparison means for converting said differences into numerical values representing deviations of the fiber diameter from a predetermined magnitude, and display means connected to said calculating means for visualizing said numerical values.

4. An apparatus as defined in claim 2 or 3 wherein said capacitor is provided with dielectric spacing means keeping said plates separated from each other and from the vicinity of the path of said fiber.

* * * * *